(12) United States Patent  (10) Patent No.: US 8,033,430 B2
Salmela et al.  (45) Date of Patent: Oct. 11, 2011

(54) POT-TYPE HEATED FLUID DISPENSER

(76) Inventors: Juha K. Salmela, Citrus Heights, CA (US); James M. Tuyls, Vacaville, CA (US); Darrell D. Pickens, Irvine, CA (US)

( * ) Notice: Subject to any disclaimer, the term of this patent is extended or adjusted under 35 U.S.C. 154(b) by 341 days.

(21) Appl. No.: 12/423,436

(22) Filed: Apr. 14, 2009

(65) Prior Publication Data

US 2009/0283544 A1 Nov. 19, 2009

Related U.S. Application Data

(60) Provisional application No. 61/044,847, filed on Apr. 14, 2008.

(51) Int. Cl.
*B67D 7/82* (2010.01)
*B67D 7/80* (2010.01)
*G01F 11/00* (2006.01)
(52) U.S. Cl. .......... 222/146.5; 222/146.2; 222/148; 222/333; 222/642; 99/467
(58) Field of Classification Search .......... 222/146.1, 222/146.2, 146.5, 148, 251, 325, 333, 372, 222/638, 639, 642; 99/467, 468, 483
See application file for complete search history.

(56) References Cited

U.S. PATENT DOCUMENTS

| 3,781,942 | A |   | 1/1974  | Coleman |
| 4,094,446 | A | * | 6/1978  | Brutsman ............... 222/146.5 |
| 4,941,597 | A | * | 7/1990  | Lopez et al. ............ 222/146.5 |
| 5,799,832 | A |   | 9/1998  | Mayo |
| 5,950,867 | A | * | 9/1999  | Martindale et al. ............ 222/1 |
| 6,131,766 | A |   | 10/2000 | King et al. |
| 2002/0179642 | A1 | | 12/2002 | Gutierrez et al. |
| 2003/0159596 | A1 | | 8/2003 | Tuyls et al. |

* cited by examiner

*Primary Examiner* — Darren W Gorman
(74) *Attorney, Agent, or Firm* — Kilpatrick Townsend & Stockton LLP (57) ABSTRACT

The embodiments of the present invention are directed to a dispensing apparatus for dispensing a flowable product at or above a preset elevated temperature through a dispensing outlet. Such an apparatus includes a pot in which to house the product. The dispensing apparatus also includes a pump coupled between the pot and the dispensing outlet to pump the flowable product from the pot to the dispensing outlet. A rope heater configured to heat the pot may also be included in the dispensing apparatus. The pot may have a movable lid, which may vacuum seal the product against the exterior environment. The lid is designed to scrape any food product residue off the vertical walls of the pot, while also maintaining the vacuum as it moves into the pot. The pot may have a check valve to prevent product spilling when the pot is lifted out of the housing.

11 Claims, 7 Drawing Sheets

POT-TYPE HEATED FLUID DISPENSER

CROSS-REFERENCES TO RELATED APPLICATIONS

This application claims priority to U.S. Provisional Patent Application No. 61/044,847, filed Apr. 14, 2008, the disclosure of which is hereby incorporated by reference in its entirety.

BACKGROUND OF THE INVENTION

The present invention relates generally to a dispensing apparatus and, more particularly, to an apparatus for dispensing a flowable product at an elevated temperature. The flowable product includes a fluid that may or may not contain particulates, such as molten cheese, cheese sauces, chili, other condiments, and the like.

It is often desirable to dispense a condiment such as cheese sauce, mustard, ketchup, and other flowable food products from a product container. To prevent bacterial growth in low acid food products, such products are maintained at or above an elevated temperature, typically about 140° F. or higher, after the container is opened. Often the food products are available in flexible packages or bags, and are dispensed from such packages.

One such desirable dispensing system is described in the assignees U.S. Pat. No. 7,025,230, the teachings of which are incorporated herein by reference. The systems disclosed in the '230 patent are directed to a dispensing apparatus for dispensing a heated fluid or a flowable food product from a package while maintaining the product at or above a preset elevated temperature. In one embodiment, an apparatus for dispensing a flowable product from a product package through a dispensing outlet at or above a preset elevated temperature includes a container in which to dispose the product package. The container includes a gas inlet and a gas outlet. A dispensing outlet is provided to dispense the flowable product from the product package, and is disposed adjacent the gas outlet. A pump is coupled between the product package and the dispensing outlet to pump the flowable product from the product package to the dispensing outlet. A heated gas flow controller is configured to direct a heated gas flow in the container to heat the product package, the pump, and the dispensing outlet. The heated gas flow includes gas flowing into the container via the gas inlet and gas flowing out of the container via the gas outlet adjacent the dispensing outlet.

While the systems described in the '230 patent provide many advantageous features, these systems can also face various operational challenges. One operational challenge is posed by the need to dispense a precisely metered amount of food product each time while also using food product as fully as possible before replacing the container. One dispensing system that attempts to achieve these goals is described in the assignees U.S. patent application Ser. No. 11/860,427, the teachings of which are incorporated herein by reference. The systems disclosed in the '427 application use food product in sealed bags or packages. The food product is squeezed from the bag or package by a roller that is positioned on a ramp above the food package. The weight of the roller presses against the product package below the roller, thereby increasing pressure in the food package and driving the food product towards the pump, while assuring that the amount of food left in the food product package is minimized. The dispensing mechanism may be housed in a housing that can slide and tilt outside its frame thus enabling convenient replacement of the product bag.

While the systems described in the '427 application provide advantageous features with respect to, inter alia, efficient use of the food product and convenience of the product bag replacement, these systems can also face various operational challenges. Some of the operational challenges are related to the presence of moving mechanical parts, like air-circulation fans and product squeezing rollers, and physical contact between pump impeller and the food, potentially resulting in food contamination.

Some other dispensing systems have heated pots which maintain the flowable food product at a desired temperature. Dispensing of the flowable food product is typically done manually, either using a ladle or a spout attached to the pot. Those dispensing systems are widely available on the market. For example, Galasource Co. from Denver, Colo. markets a heated pot type food dispenser with a spout (model no. 86600) and with a ladle (model no. W-4BPKG). Due to the manual dispensing of these systems, it is difficult to precisely control the amount of the product dispensed. Furthermore, because the surface of the food product is in contact with air, a dry skin on the exposed surface of the product forms, which is also undesirable.

There remains a need for an easy-to-use apparatus for dispensing food products at or above a preset elevated temperature that allows for a simple and safe food product replacement, efficient utilization of the product, and simple and reliable operation.

BRIEF SUMMARY OF THE INVENTION

The embodiments of the present invention are directed to a dispensing apparatus for dispensing a flowable product at or above a preset elevated temperature through a dispensing outlet. Such an apparatus includes a pot in which to house the product. The dispensing apparatus also includes a pump coupled between the pot and the dispensing outlet to pump the flowable product from the pot to the dispensing outlet. A rope heater configured to heat the pot may also be included in the dispensing apparatus. The pot may have a movable lid, which may vacuum seal the product against the exterior environment. The lid may be designed to scrape any food product residue off the vertical walls of the pot, while also maintaining the vacuum as it moves into the pot. The pot may have a check valve to prevent product spilling when the pot is lifted out of the stationary vat.

In one embodiment, an apparatus for dispensing a flowable product has: a pot having a check valve disposed at the bottom; an inner vat configured to house the pot; a heater disposed around the inner vat and configured to maintain the flowable product at an elevated temperature; a movable lid configured to cover the top of the pot; a pump in a fluidic connection with said check valve through a first hose and in a fluidic connection with a dispensing outlet through a second hose; and an activation switch configured to start the pump rotation for a duration of time, thus dispensing the flowable product through the dispensing outlet.

In one aspect, the heater is a rope heater.

In another aspect, a wiper is disposed around the movable lid, the wiper being configured to be in contact with the inner surface of said pot, thus scraping the flowable product residue back into the pot as the movable lid moves deeper into the pot.

In another aspect, the movable lid has a vacuum valve configured to maintain a vacuum between the movable lid and the flowable product in the pot.

In another aspect, the amount of the flowable product dispensed is controlled by a speed control which sets a speed of the pump and by an over-under control which sets the time of the pump operation for a dispensing cycle.

In another aspect, a heat capacitor is disposed around the second hose proximately to the dispensing outlet, an insulator is disposed around the heat capacitor and the second hose, and a nozzle rope heater is disposed around the second hose, the insulator, or the heat capacitor, where the nozzle rope is configured to prevent a solidification of the flowable product around the dispensing outlet.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

DETAILED DESCRIPTION OF THE INVENTION

The invention described herein provides apparatus and methods for the flowable food product dispensing. The apparatus has a rope heater wound around a stationary vat to keep the product at an elevated temperature, thus making the product flowable while also reducing bacterial growth in the product. The product resides in a pot which may have a check valve that allows the product flow when the pot is seated inside the apparatus, but shuts-off when the pot is lifted up to prevent dripping of the product. The product is dispensed by a pump, which may be an impeller, peristaltic, or other type of pump. The outlet hose of the apparatus may have a thermally insulated heat capacitor to prevent the flowable product solidification which could occur due to the hose exposure to room temperature. The pot may have a movable lid with a wiper that scrapes the product back into the pot as the level of the product in the pot falls, in turn causing the lid to move into the interior of the pot. The amount of the product dispensed may be set by a pump motor speed control and by a switch connected to a control unit.

Figure 1A:
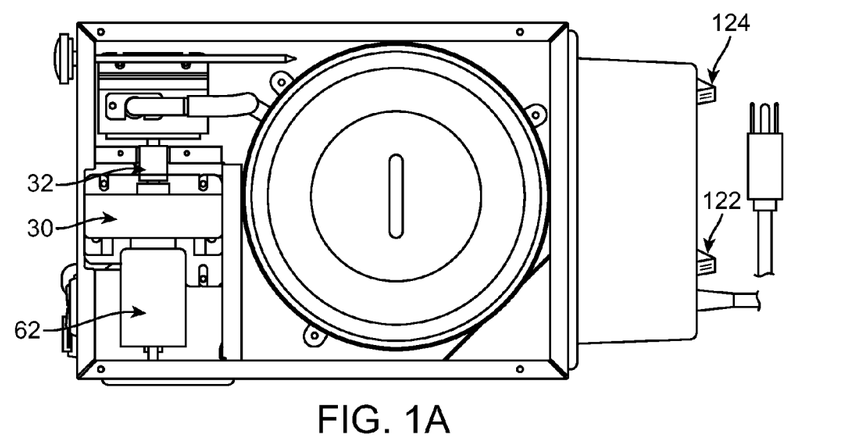
FIG. 1A is a top view of an exemplary dispensing apparatus in accordance with one embodiment of the present invention.
Figure 1B:
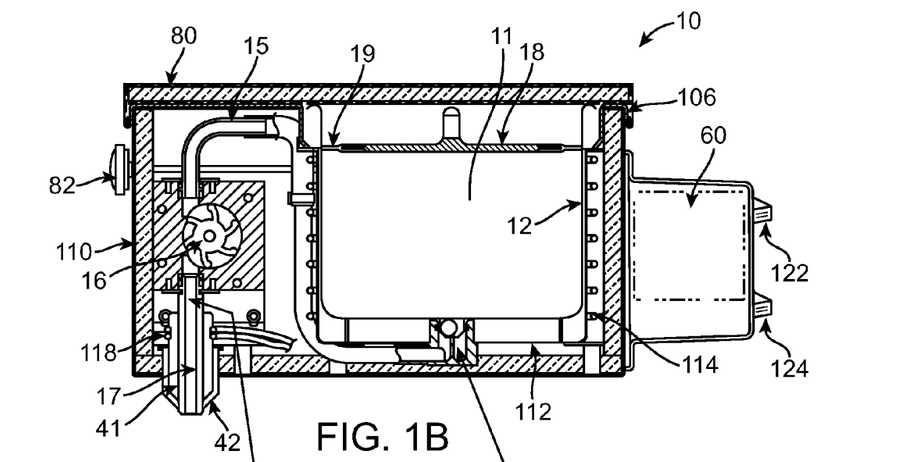
FIG. 1B is a plan, cross-section view of the dispensing apparatus of FIG. 1A.

FIGS. 1A and 1B show top and plan views, respectively, of a dispensing apparatus 10 for dispensing a flowable product 11, such as molten cheese, cheese sauces, chili, or some other condiment. The flowable product is contained in a pot 12, which is partially housed in a stationary vat 112. The pot 12 is kept at a preset dispensing temperature by a rope heater 114, which can be wound around the stationary vat 112. A rope heater is illustrated in FIG. 1B, but other heaters are also possible, for example foil heaters or other types of heaters. Many such heaters are readily available on the market, and are well known to a person skilled in the art. The rope heater can be powered off 24 V DC or 110 V AC sources. The DC operation may be preferred from a safety point of view. The operation of the rope heater 114 can be controlled by control unit 60 which may be a PLC controller that regulates DC voltage based on a desired target temperature of the flowable product. The desired temperature can be dialed by a temperature control knob 124, which is connected to the programmable controller 60. Under this control mode, the control unit 60 turns the heater on and off to keep the temperature of flowable product 11 within a desired range. In the alternative, the rope heater may be wired to a fixed voltage, DC or AC, thus making the flowable product temperature a function of the outside ambient temperature, which can work well for an environment having a well known and well controlled ambient temperature. An insulated removable cover 80 and an insulated outer case 110 prevent unnecessary heat losses by containing the heat in the area occupied by the flowable product, while also lowering the temperature of the outside surface, thus making it safe for the operator to touch the outer side of the dispensing apparatus. A thermometer 82 indicates temperature of the interior of the apparatus.

The flowable product is dispensed through a first hose 15 connecting the pot 12 with a pump 16, and further through a second hose 17 out of the dispensing apparatus. The second hose 17 may have a valve at its outlet. An impeller pump 16 is illustrated in FIG. 1B, but other pumps, for instance, a peristaltic pump may also be used. Peristaltic pumps rely on squeezing the hoses, preferably soft hoses, thus urging the product out of the pump. One advantage of the peristaltic pump is the absence of the physical contact between the interior of the pump and the fluid, i.e. the flowable product. Another advantage of the peristaltic pump is that the hoses can be replaced without having to disconnect or replace the pump itself, thus minimizing cleaning effort when, for example, a type of the flowing product is changed. Other pumps may be used, for instance a diaphragm pump or a piston pump. The torque for the pump rotation is provided by a motor 62 through a gear box 30. The speed of the motor 62 can be controlled by a motor speed control 122, which interacts with the programmable controller 60. A higher speed of pump translates into more flowable product dispensed per each dispensing cycle.

Figure 3:
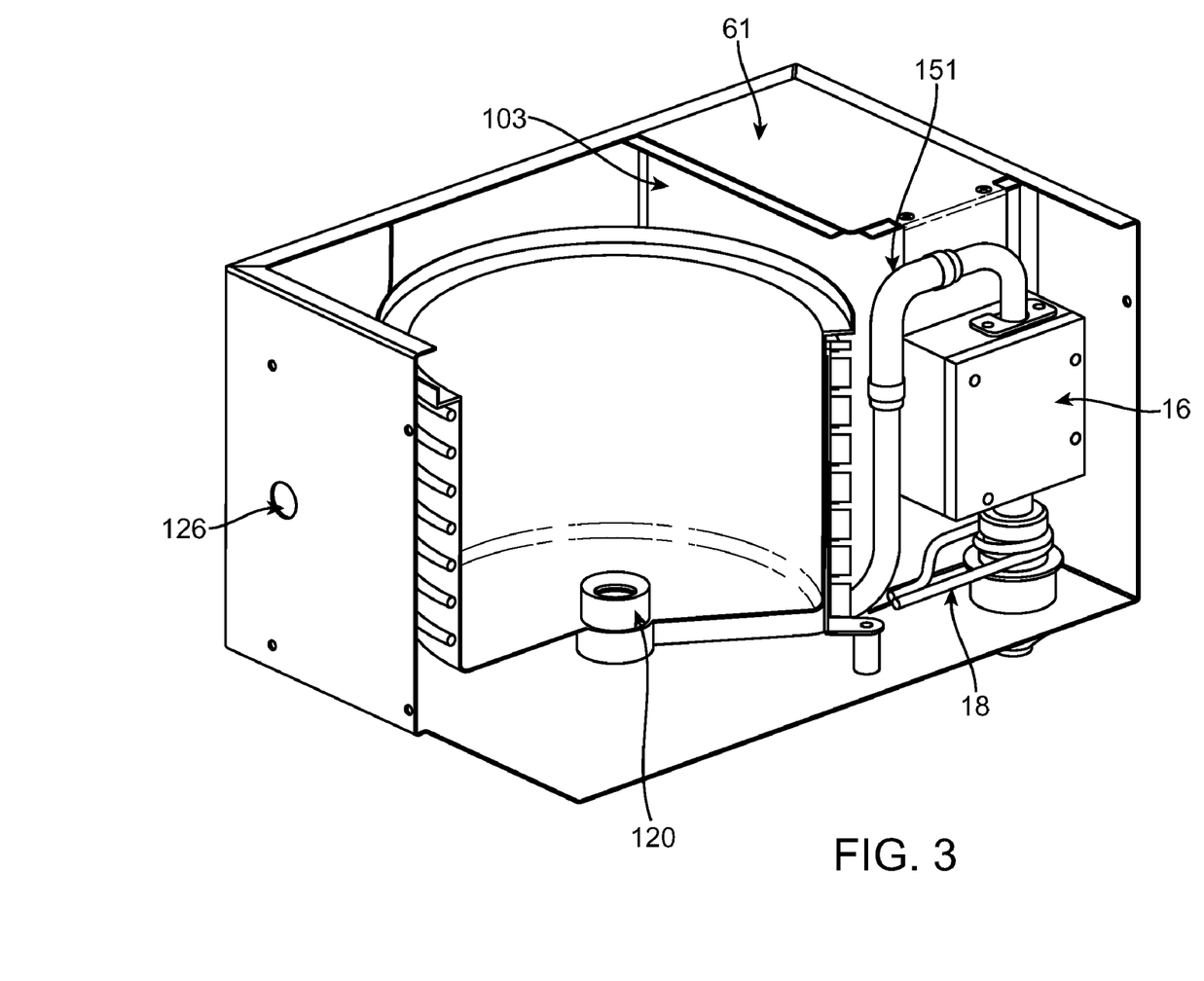
FIG. 3 is a partial isometric view showing the pump and the stationary vat of an exemplary dispensing apparatus.

As shown in FIG. 1B, the outlet of the second hose 17 is exposed to the outside environment at the room temperature, thus especially susceptible to product solidification. In order to reduce the tendency of the flowable product to solidify, a nozzle rope heater 118 can be disposed around the end of the second hose 17. The nozzle rope heater 118 may be powered off the same voltage source as the rope heater 114. Aside from the rope heaters, other types of the heaters can be used to prevent product solidification in the second hose. FIG. 1E is an exploded view showing a nozzle heat capacitor 41 and a nozzle insulator 42, which further reduce the tendency of the flowable product to solidify. The heat capacitor 41 is disposed around the end of the hose 17. The heat capacitor helps keeping the flowable product at the end of the hose 17 above the solidification temperature when impeller pump 16 is turned off, i.e. when flowable product is stagnant in the hose. The effect of the heat capacitor 41 is further improved by an insulator 42 which is disposed around the outer surface of the heat capacitor to reduce its heat losses. The heat capacitor 41 has a hole that fits snuggly over second hose 17. The outside surface of the heat capacitor is circular in FIG. 1E, but may have other shapes as well. The heat capacitor may be made of aluminum, copper, or some other material with high heat capacity. The insulator 42 is made to fit over the outside surface of heat capacitor 42. A circular insulator is shown in FIG. 3, but other shapes are also possible. Insulator 42 may be made of plastic, rubber, or some other low thermal conductivity material.

Figure 1C:
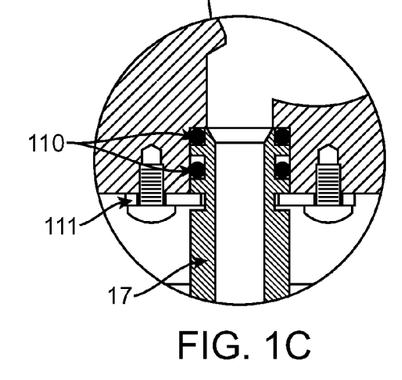
FIG. 1C is a plan, cross-section view showing a detail of one embodiment of the second hose attachment.

FIG. 1C shows a detail of the second hose 17 attachment with the pump housing. The second hose 17 can have O-rings 110 disposed in the circumferential grooves of the hose. The O-rings 110 reduce the leakage of the flowable product around the second hose 17. The O-rings may be high temperature O-rings. The second hose 17 can be held in place by a clip 111, which can be screwed to the pump housing.

Figure 1D:
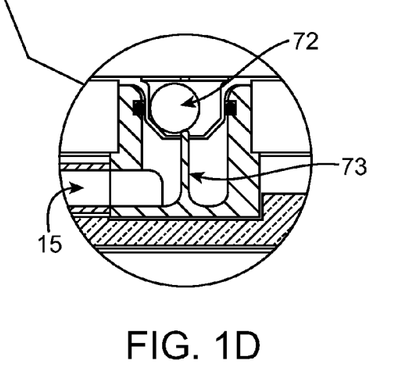
FIG. 1D is a plan, cross-section view showing details of one embodiment of the check valve.
Figure 1E:
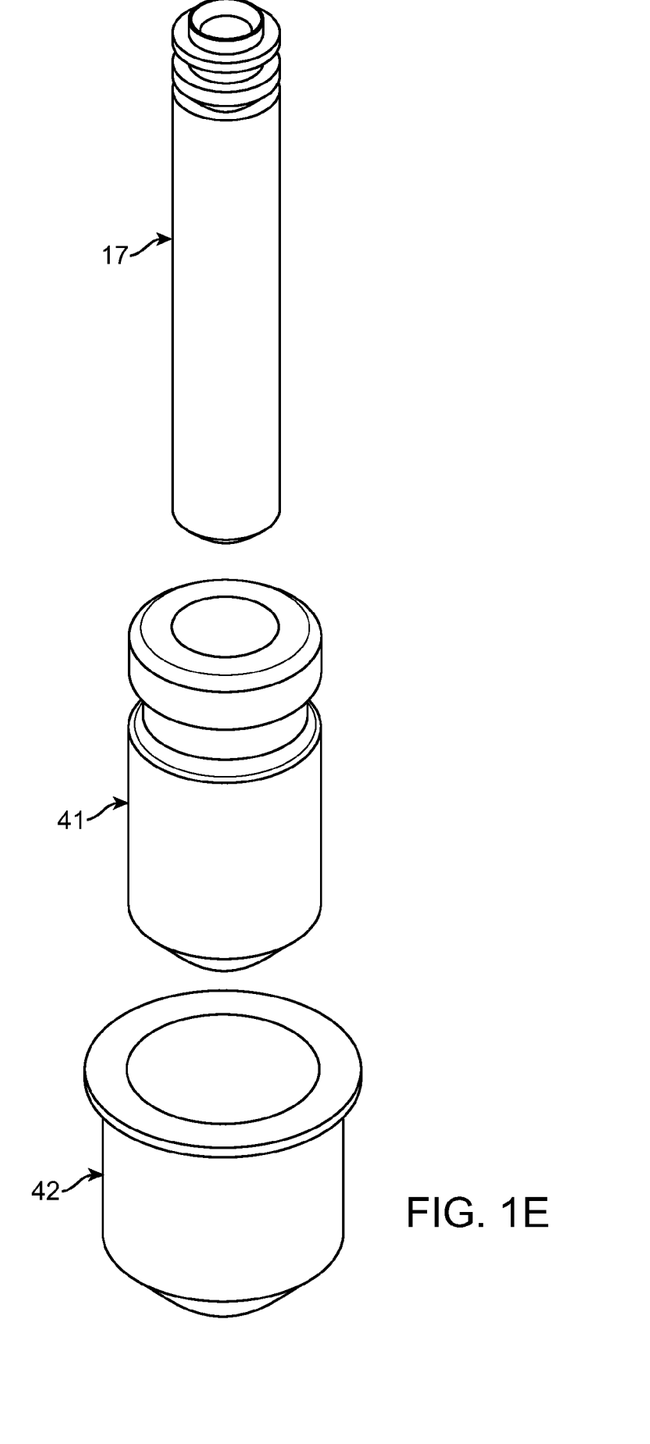
FIG. 1E is an exploded view showing one embodiment of the second hose insulation.

As shown in FIG. 1D, the pot 12 can have a check valve 72, which may be a ball check valve. The check valve is designed to allow escape of the flowable product 11 when the pot 12 is seated inside the dispensing apparatus 10, but also to prevent leakage of the flowable product when the pot 12 is lifted outside of the dispensing apparatus. The check valve 72 is in a closed position when the pot 12 is outside of the apparatus, thus preventing a leakage of the flowable product. When the pot 12 is lowered into the dispensing apparatus 10, a pin 73 comes in contact with the check valve 72, thus pushing a ball or other shut-off insert of the valve up, and allowing the flowable product into the first hose 15. When the pot 12 is lifted up again, check valve assumes its closed position again, thus preventing the leakage of the flowable product.

Figure 1F:
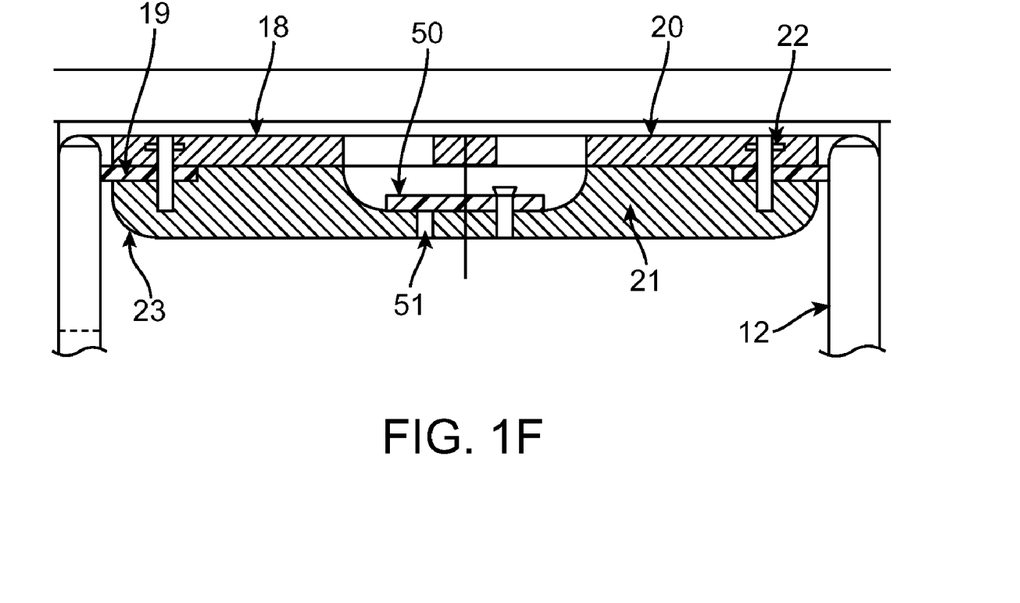
FIG. 1F is a plan, cross-section view of one embodiment of the pot and the lid.

FIG. 1F shows one embodiment of a movable lid 18 which covers the pot 12. The movable lid 18 can have a wiper 19 disposed circumferentially around movable lid 18 such that a snug fit between the wiper 19 and the interior surface of the pot 12 is formed. Wiper 19 is held in place between upper shell 20 and lower shell 21 of movable lid 18 by fasteners 22, which are passing through the shells and the wiper. It will be appreciated by a person skilled in the art that the fasteners 22 do not necessarily have to pass through the holes in the wiper 19. For example, the fasteners 22 may provide a sufficient clamping force between the shells of the movable lid to keep wiper 19 securely sandwiched between the plates. The movable lid 18 floats on the surface of the flowable product. As the flowable product 11 is dispensed out of dispensing apparatus 10, the volume of the product in the pot is reduced, therefore lowering the level of the flowable product. As the level of the flowable product falls lower so does movable the lid 18. The downward movement of the movable lid causes the wiper 19 to rub against the vertical wall of the pot 12, thus removing any product residue off the pot wall and back into the pot interior. A lower shell 21 of the movable lid 18 has curvature 23 that matches curvature 24 at the bottom of pot 21. The contact of the matching curvatures 23 and 24 further squeezes out flowable product 11, thus minimizing product residue that can not be dispensed and used.

Figure 1G:
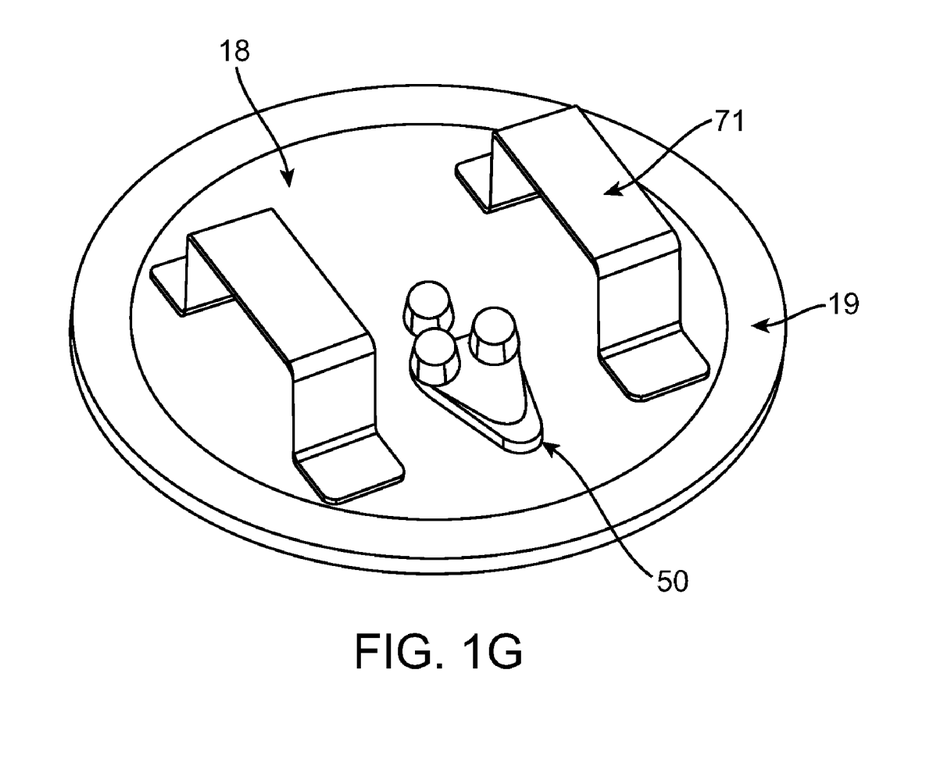
FIG. 1G is an isometric view of one embodiment of the lid.

FIG. 1G shows another embodiment of the movable lid 18 having an overmolded wiper 19. Also shown is a vacuum relief valve 50 that, together with the wiper 19, prevents air from entering the pot 12. The absence of air inside the pot achieves two benefits: surface of the flowable product does not dry out and the removal of the pot 12 is made easier, because when the movable lid 18 is pulled up by a handle 71, a vacuum between the movable lid 18 and the interior of the pot 12 prevents removal of the movable lid 18 out of the pot 12, causing the entire covered pot assembly to be lifted out of the system. Once safely out of dispensing apparatus 10, the vacuum can be broken by lifting the flap on a vacuum relief valve 50. Lifting the flap allows air to enter the pot through, thus breaking the vacuum. The movable lids without the vacuum valve are also possible.

Figure 2:
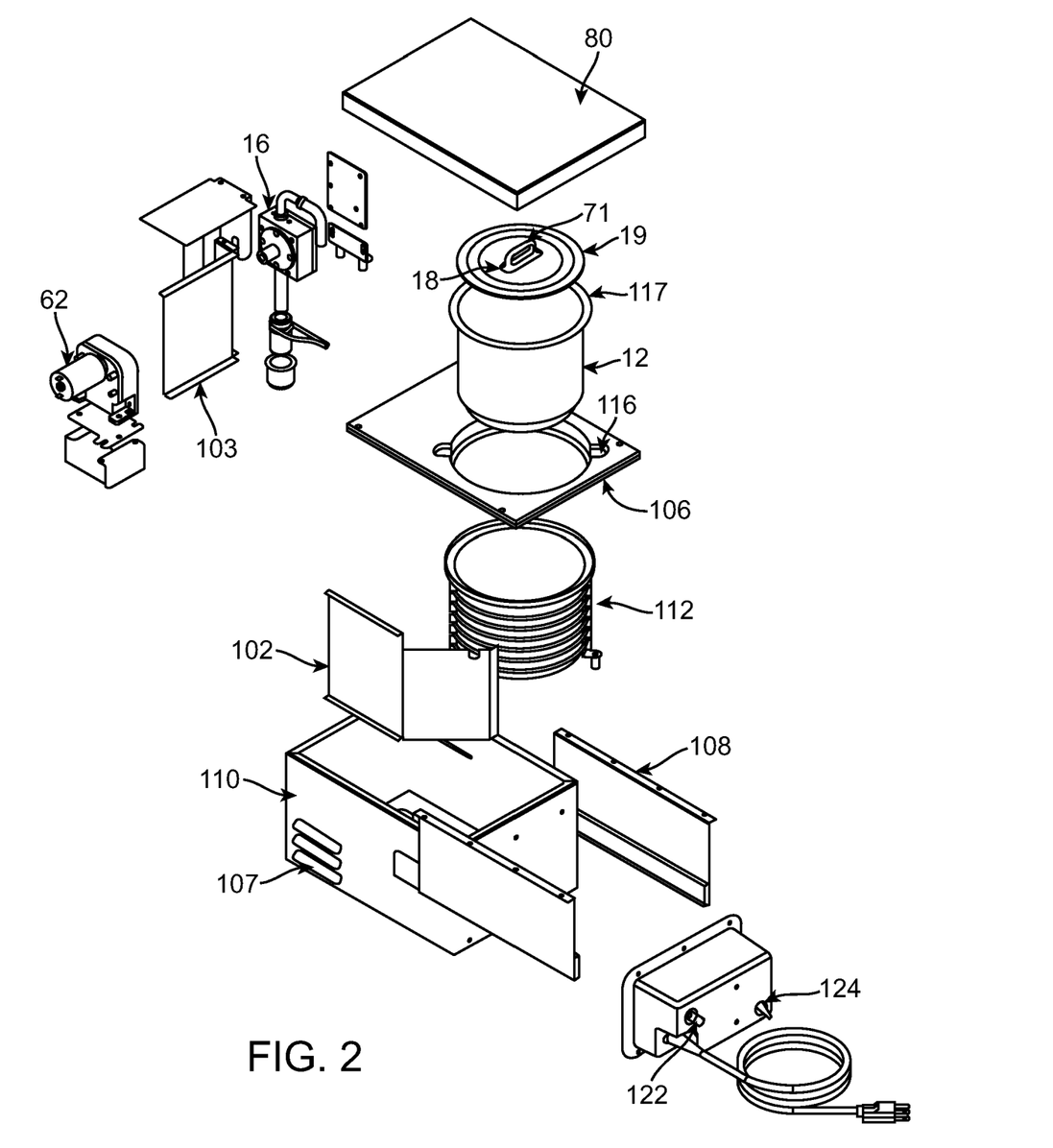
FIG. 2 is an exploded view showing the inner parts of an exemplary dispensing apparatus.

FIG. 2 shows an exploded view of the dispensing apparatus 10. The pot 12 is partially housed inside the stationary vat 112 that has a rope heater. The pot can be lifted out of the apparatus by removing the insulated removable cover 80, grabbing a curved edge 117 of the pot through the finger slots 116 on a cover 106, and then lifting the pot out of the dispensing apparatus. If the movable lid 18 retains a sufficient vacuum, with or without a vacuum valve, then the pot 12 can be lifted up by the handle 71. Since the flowable product must be kept at an elevated temperature by the rope heaters, the parts of the apparatus that may be temperature sensitive, for example, the pump, gearbox, or cables, can be protected by a motor compartment heat shield 103 and a wire harness heat shield 102. The temperature sensitive parts of the dispensing apparatus can be exposed to a cooler outside ambient air by openings 107 on the outer case 110. The dispensing apparatus 10 can optionally be slidably mounted under a surface using the mounting brackets 108.

FIG. 3 shows a cut-out view of the dispensing apparatus with the pot 12 removed. As explained with reference to FIG. 2, the cables, motor, gearbox, and other temperature sensitive parts can be protected against the excessive heat either behind the motor compartment heat shield 103 or the wire harness heat shield 102 (not shown). A power cord can enter the interior of the dispensing apparatus through a wire hole 126. The first hose 15 may be made in part from a flexible connection 151, thus enabling an easier removal of the pump 16.

Figure 4A:
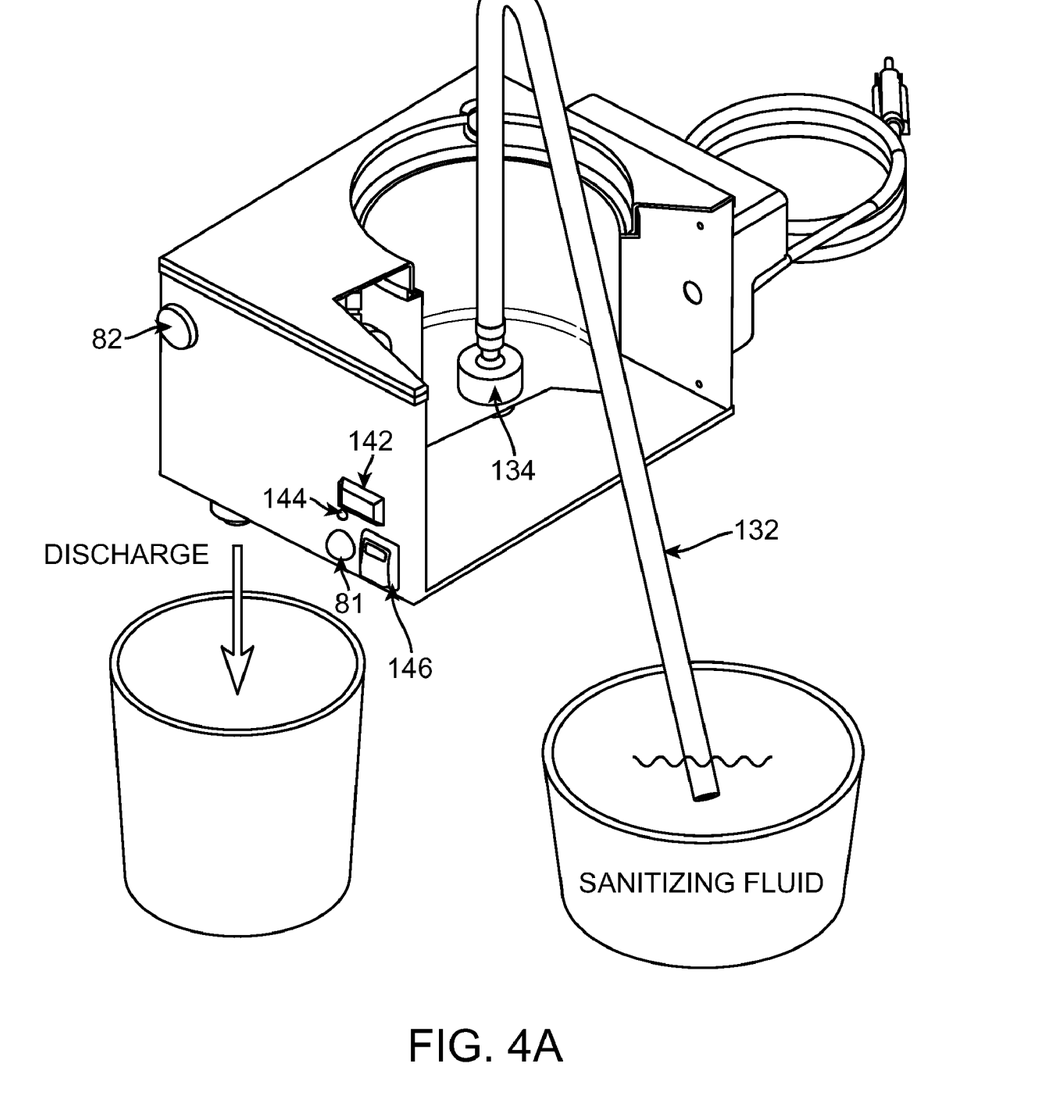
FIG. 4A is a partial isometric view showing an exemplary sanitizing operation.

FIG. 4A shows a cut-out view of the dispensing apparatus 10 undergoing a sanitization. From time to time or when a type of product is changed, a sanitization can be performed using a sanitizing hose 132 which is connected to the product inlet fitting by a sanitizing hose fitting 134. A variety of suitable sanitizing fluids are available on the market. The sanitizing fluid flow can be started by flipping a mode switch 146 to "sanitize" position, which starts the pump. The discharge fluid can be collected at the secondary hose outlet. The mode switch 146 has three positions: "sanitize," "on," and "off," but other switches with more or less positions are also possible. When in the "on" position, the mode switch 146 is ready for normal dispensing operation. A status light 144 is illuminated when the mode switch is in the "on" position. In the normal dispensing operation, the flowable product dispensing is accomplished by pressing an activation button 81. The amount of the flowable product dispensed can be adjusted up or down by pressing an over-under rocking switch 142 prior to pressing the activation button 81. The over-under switch 142 is connected with the control unit 60, which, in response to activating the over-under switch, makes the pump run longer or shorter time. Additionally, as explained in reference with FIG. 1B, the speed of the pump motor can be controlled by the motor speed control 122, thus further adjusting the amount of the flowable product dispensed. As will be understood by those skilled in the art, a wide variety of switches is readily available on the market. The switches described here are just one possible combination, but many more are possible.

Figure 4B:
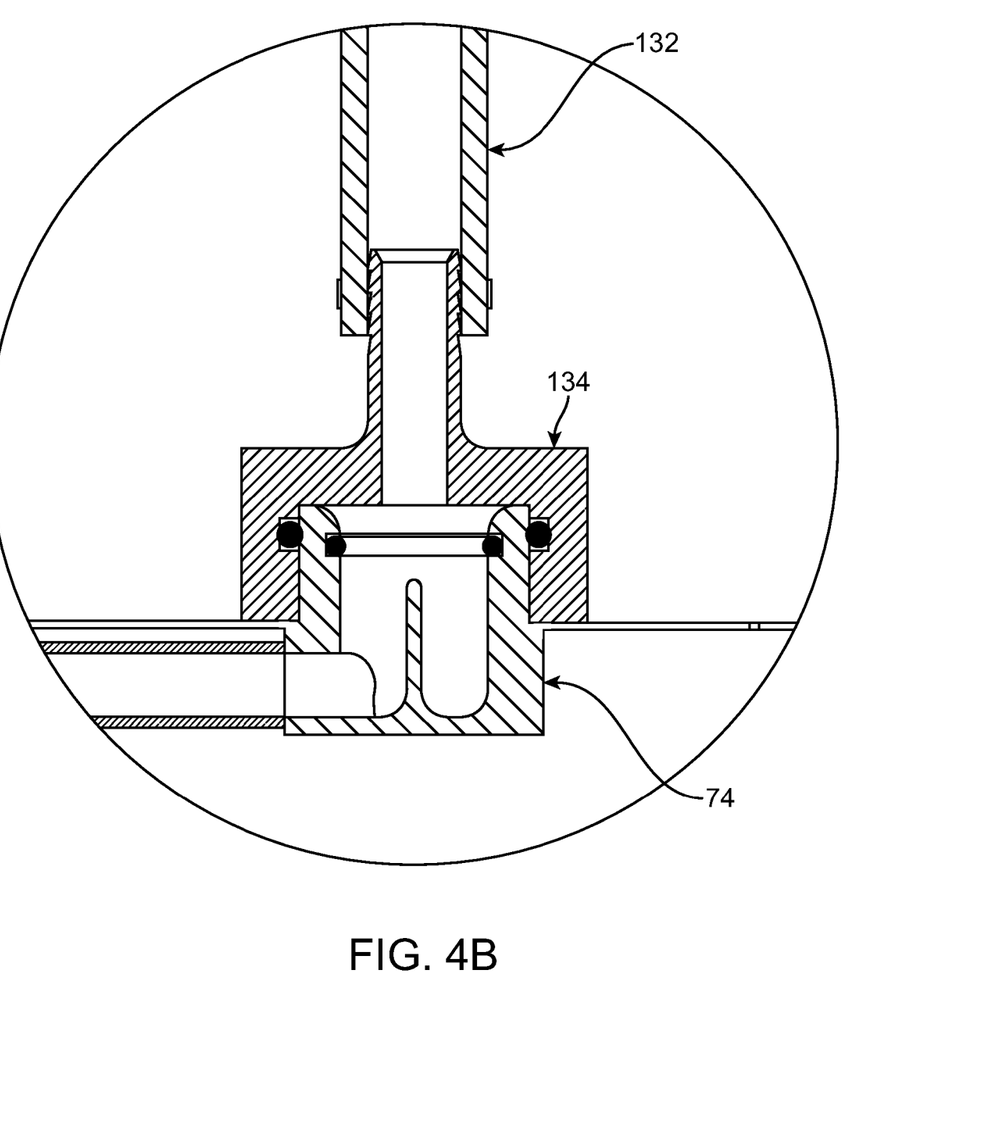
FIG. 4B is a plan, cross-section view showing a detail of one embodiment of the sanitizing hose attachment.

FIG. 4B shows a detail of the sanitizing hose 132 connection with the product inlet fitting 74. A sanitize adapter 134 can have an inner diameter that corresponds to the outer diameter of the product inlet fitting 74. The sanitize adapter 134 can have one or more O-rings which prevent leaking of the flowable product between the fitting 74 and the sanitize adapter 134.

As will be understood by those skilled in the art, the present invention may be embodied in other specific forms without departing from the essential characteristics thereof. These other embodiments are intended to be included within the scope of the present invention, which is set forth in the following claims.

What is claimed is:

1. An apparatus for dispensing a flowable product comprising:
    a pot having a check valve disposed at the bottom;
    an inner vat configured to house the pot;
    a heater disposed around the inner vat and configured to maintain the flowable product at an elevated temperature;
    a movable lid configured to cover the top of the pot;
    a pump in a fluidic connection with said check valve through a first hose and in a fluidic connection with a dispensing outlet through a second hose; and
    an activation switch configured to start the pump operation for a duration of time, thus dispensing the flowable product through the dispensing outlet.

2. The apparatus of claim 1, wherein said heater is a rope heater.

3. The apparatus of claim 1, further comprising a wiper disposed around the movable lid, said wiper configured to be in contact with the inner surface of said pot, thus scraping the flowable product residue back into the pot as the movable lid moves deeper into the pot.

4. The apparatus of claim 1, wherein said movable lid comprises a vacuum valve configured to maintain a vacuum between the movable lid and the flowable product in the pot.

5. The apparatus of claim 1, wherein said pump is selected from a group consisting of an impeller pump, a diaphragm pump, a piston pump, and a combination thereof.

6. The apparatus of claim 5, wherein the amount of the flowable product dispensed is controlled by a speed control which sets a speed of the pump and by an over-under control which sets the time of the pump operation for a dispensing cycle.

7. The apparatus of claim 1 further comprising:
    a heat capacitor disposed around the second hose proximately to the dispensing outlet,
    an insulator disposed around the heat capacitor and the second hose, and
    a nozzle rope heater disposed around the second hose, the insulator, or the heat capacitor, said nozzle rope heater configured to prevent a solidification of the flowable product around the dispensing outlet.

8. The apparatus of claim 1, further comprising a mode switch configured to select the dispensing apparatus operation among: on, off, and sanitize modes.

9. The apparatus of claim 1, further comprising a status-light configured to indicate that the dispensing apparatus is powered on.

10. The apparatus of claim 1, further comprising a thermometer that indicates the temperature of the dispensing apparatus interior.

11. The apparatus of claim 1, further comprising a sanitizing hose connected with a product inlet fitting by a sanitize adapter.

* * * * *